United States Patent [19]

Béteille

[11] Patent Number: 4,598,888
[45] Date of Patent: Jul. 8, 1986

[54] FIXED-WING AIRCRAFT WITH TANDEM SUPPORTING SURFACES

[75] Inventor: Roger H. Béteille, Blagnac, France

[73] Assignee: Airbus Industrie, France

[21] Appl. No.: 621,261

[22] Filed: Jun. 15, 1984

Related U.S. Application Data

[63] Continuation-in-part of Ser. No. 144,357, Apr. 28, 1980, abandoned.

[30] Foreign Application Priority Data

Jan. 9, 1980 [FR] France ................. 80 00443

[51] Int. Cl.$^4$ .............................. B64C 13/16
[52] U.S. Cl. ................. 244/76 R; 244/45 A; 244/178; 364/435; 364/442
[58] Field of Search ............ 244/89, 45 A, 203, 76 R, 244/177, 175, 178, 181, 194, 228; 364/442, 435, 433, 434; 318/583, 584

[56] References Cited

U.S. PATENT DOCUMENTS

| | | | |
|---|---|---|---|
| 2,402,311 | 6/1946 | Bissett | 244/45 A |
| 2,541,620 | 2/1951 | Stalker | 244/45 A |
| 2,601,962 | 7/1952 | Douglas | 244/89 |
| 2,924,400 | 2/1960 | Ruget | 244/45 A |
| 3,240,447 | 3/1966 | Olshausen | 244/177 |
| 3,253,809 | 5/1966 | Robertson | 244/89 |
| 3,362,659 | 1/1968 | Razak | 244/45 A |
| 3,680,816 | 8/1972 | Mello | 244/89 |
| 3,848,833 | 11/1974 | Rauschelbach | 244/177 |
| 3,954,231 | 5/1976 | Fraser | 244/45 A |
| 4,159,088 | 6/1979 | Cosley | 364/442 |

FOREIGN PATENT DOCUMENTS 2361888  6/1975 Fed. Rep. of Germany ... 244/45 A

Primary Examiner—Galen Barefoot
Attorney, Agent, or Firm—Steinberg & Raskin

[57] ABSTRACT

A fixed-wing aircraft with tandem lifting surfaces has monoplane main wings secured in an intermediate area of the fuselage and a horizontal tail surface with at least one stabilizer plane mounted at the tail of the fuselage. A third supporting surface on the fuselage is in tandem arrangement with the other supporting surfaces. The third supporting surface is a canard surface positioned ahead of the center of gravity of the aircraft.

7 Claims, 2 Drawing Figures

FIXED-WING AIRCRAFT WITH TANDEM SUPPORTING SURFACES

BACKGROUND OF THE INVENTION

This is a continuation-in-part of application Ser. No. 144,357, filed on Apr. 28th 1980, for fixed-wing aircraft with tandem supporting surfaces, now abandoned.

The present invention relates generally to a fixed-wing aircraft or airplane, of the kind having lift-generating supporting surfaces or airfoils positioned according to a tandem arrangement and comprising preferably monoplane main wings secured at an intermediate position of the fuselage and a horizontal tail surface with at least one stabilizer plane mounted at the rear of said fuselage. More particularly the invention is essentially directed to improvements to airplanes of the aforesaid type and it also relates to the various applications and uses resulting from its performance as well as to airplanes and like engine-powered aircrafts, aerodynes and air locomotion or flying machines which are fitted with such improvements.

With the airplanes known from the prior state of the art, comprising a main supporting or lifting surface and a horizontal tail surface with a selectively adjustable elevator, the dive produces in particular onto airplanes of great lengths, a strong longitudinal moment and the balance or trim is maintained by the horizontal tail surface or plane by means of an aerodynamic force opposing the lift of the airplane. The negative lift of the horizontal tail surface has to be compensated for by exerting upon the airfoil or supporting surface an additional lift thus resulting in an increase in the airfoil loads and accordingly in the weight of the latter (in view of the structural reinforcement thus required to provide for a satisfactory mechanical strength). These additional aerodynamic loads upon the airfoil would cause in turn higher drags and thereby reduce the flight range through the shift of the limit of occurrence of buffeting. The aforesaid inconveniences are inherent in high-speed flight as well as in low-speed flight.

SUMMARY OF THE INVENTION

The principal object of the invention is therefore to remove such inconveniences in particular but not exclusively on relatively long airplanes and for this purpose the airplane according to the invention is characterized in that it comprises, in addition to both aforesaid supporting surfaces or like airfoils consisting of the main wings and of the horizontal tail surface, respectively, a third supporting hence lift-generating surface or like airfoil fitted on the fuselage according to a tandem arrangement relationship with the two other aforesaid supporting surfaces and consisting of a so-called canard aerofoil surface positioned ahead or in front of the center of gravity of the airplane. Owing to such an arrangement, consisting of a new combination of means known per se, the aerodynamic balance or trim force to be produced at the horizontal tail surface will become positive thereby making it possible to relieve the airfoils or supporting surfaces of their strains by decreasing the loads which they are undergoing.

Most often the stabilizer plane of the horizontal tail surface is provided with at least one movable elevator and according to another characterizing feature of the invention, this stabilizer plane has a selectively variable relative position at least in angular orientation so as to be susceptible to a deflection through controlled or possibly automatic adjustment in accordance with flight conditions, thereby to be adaptable to any flight configuration or airplane evolution.

According to still a further characterizing feature of the invention, said canard surface consists on each side of the fuselage, of a canard plane and of a movable trailing edge elevator-like or elevon-like or aileron-like control surface. In an airplane provided with additional flying control devices for low-speed or slow flights and in particular comprising at least one lift-increasing or plain flap and/or a leading edge slat on each main wing, each trailing edge control surface of said canard aerofoil is under the servo-control in monitored follow-up or interlocked relationship of the instant relative position of said lift-increasing or plain flap and/or of said leading edge slat, so that the control surface deflecting motion be automatically controlled in interacting relationship by the displacement or deflection of said lift-increasing flap and/or of said leading edge slat.

These features are advantageous because in view of the canard aerofoil and its adjustable trailing edge flaps or control surfaces, it enables the airplane to fly in any cruising configurations with an optimum angle of incidence or of attack for each one of its three aforesaid airfoils or supporting surfaces. In particular the previous adjustment of the canard surface in follow-up relationship with or under the servo-control of the deflections of the main wing lift-increasing flaps will enable the airplane to perform evolutions satisfactorily in low-speed or slow flight. Due to this lift-increase thus achieved by the canard surface, the flight performance in particular at take-off and at landing of the airplane will be substantially improved.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
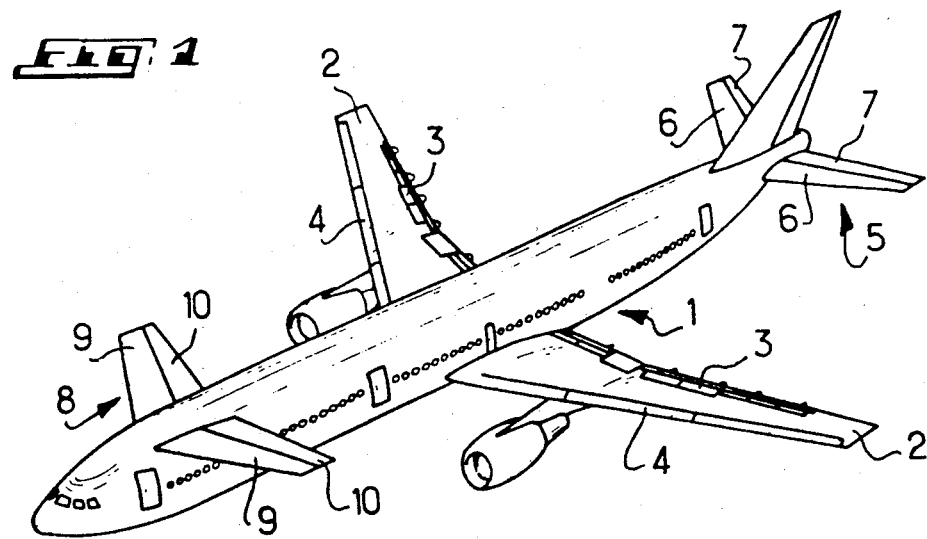
FIG. 1 is a perspective view of a big transport airplane provided with the improvement according to the invention.

According to the embodiment shown in FIG. 1, the airplane comprises an in particular relatively long fuselage 1 provided with main wings 2 fitted with adjustable lift-increasing flaps 3 and leading edge slats 4, a horizontal tail surface 5, having, on each side of the fuselage, a stabilizer plane 6 the trailing edge of which is fitted with a movable elevator 7 and at last at the front or nose portion of the fuselage, a canard surface 8 comprising, on each side, a canard plane 9 may either be stationary, i.e. having an invariable relative in particular angular position, or it may be selectively variable in particular in angular orientation and the leading edge of which is provided with a movable aileron-like or elevator-like control surface 10. It is to be noted that the canard airfoil 8, instead of consisting of canard plane 9 and control surface 10, may be a single canard surface having a variable angular position.

Each stabilizer plane 6 of the horizontal tail surface 5 advantageously has a variable relative position or angular orientation which is selectively adjustable in flight in order to compensate for the steady longitudinal moments whereas its elevator will generate longitudinal control moments.

Each trailing edge control surface 10 of the canard airfoil 8, or the complete canard surface, has its angular deflecting motion interlocked in servo-controlled or monitored follow-up relationship with the displacements of the lift-increasing flaps 3 of the main wings 2, in particular in accordance with the outward displacements or strokes of these flaps, so that the movements of the lift-increasing flaps 3 will automatically result in or cause the movements of the control surfaces 10 in a predetermined ratio of mutual cinematic correlation. The motion of each control surface 10 of the canard airfoil may also depend upon that of the movable leading edge slats 4 of the main wings 2 and this either separately or in combination or superposition with the motions of the lift-increasing flaps 3.

Moreover, with the airplane provided with additional flight control devices for all flight phases, means may be provided for affecting the longitudinal stability of the airplane.

Such a useful action may be obtained with the assistance of a follow-up correlation of the control of deflection of the trailing edge control surfaces 10 of the canard airfoil with the angle of incidence (not shown) of the airplane. To this servo-controlled relationship or follow-up correlation may be advantageously superposed a deflection of the control surface 10 in accordance with the Mach number or the flight velocity of the airplane.

Figure 2:
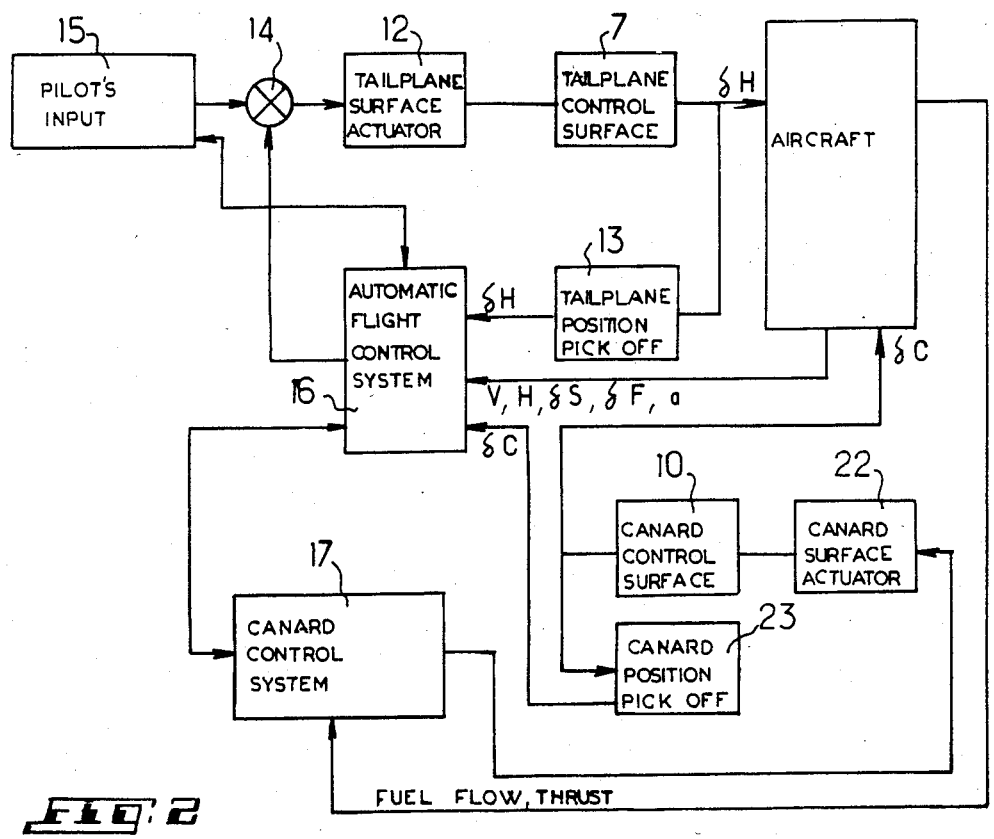
FIG. 2 is a block diagram of an exemplary embodiment of a servo-control system for a trailing edge control surface of the canard surface with a position-responsive control in follow-up relation to the respective angles of deflection of the lift-increasing flaps and of the leading edge slats of the main airfoil and the angle of incidence or attack of the airplane or of its Mach number of flight velocity.

The block diagram of a servo-controlled system of the control surface 10, or the complete canard surface of the canard airfoil in interlocked follow-up relationships with the angle of deflection of the lift-increasing flaps 3, of the angle of deflection of the leading edge slats 4, of the angle of incidence of attack of the airplane or of its Mach number or flight velocity is shown in FIG. 2.

On this Figure, the aircraft is symbolized in a rectangular form. There is provided a tail plane control channel and a canard control channel. The tail plane control channel is comprised of a tail plane surface actuator 12 operatively connected to drive tail plane control surface 7, and a tail plane position pick-off 13 for providing a signal indicative of the angular position $\delta$ H of the tail plane 7 relative to the airframe upon which it is installed. The canard channel is comprised of a canard surface actuator 22 operatively connected to drive a canard control surface 10, or the complete canard surface, and a canard position Pick-off 23 for providing a signal indicative of the angular position $\delta$ C of the canard 10 relative to the airframe upon which it is installed. The actuators 12 and 22 may be electromechanical screw jacks or electrohydraulic actuators or like means well known in the art for providing a source of mechanical motion in response to an input signal. The position pick-offs 13 and 23 may be electrically excited potentiometers or like transducer means well known in the art for providing an output signal indicative of mechanical motion.

There is also provided input summing means 14 for applying a control signal from a pilot's input signal source 15 or the like to tail-plane surface channel in combination with the input thereto from an automatic flight control system 16. It will be understood that the sense of the signal provided by automatic flight control system 16 as applied to tail-plane channel is such as to produce an angle adjustment of the angular position of movable elevator 7 or tail-plane. This signal is combined with the pilot's input signal which itself is of the sense chosen by the pilot for particular manoeuvre. Pilot's input 15 is also directly coupled to an automatic flight control system so that this latter takes into account a particular manoeuvre.

The automatic flight control system 16 is further connected to a canard control system 17 which delivers the input signal to the canard surface actuator 22. Canard control system 17 receives from the aircraft signals indicative of fuel flow and thrust. Of course, control means are provided within the aircraft for delivering the fuel flow and the thrust. Thus, a debit meter can be used for measuring the fuel flow whereas the thrust can be measured from the operating parameters of the aircraft engine, such as the rotation speed of the engine, the gas exhaust pressure etc.

Furthermore, the automatic flight control system receives from tail-plane position pick-off 13 the signal indicative of the angular position of tail-plane 7 and from the canard position pick-off 23 the signal indicative of the angular position of trailing edge control surface 10. Moreover, the automatic flight control system 16 further receives from the aircraft signals representative of Mach number or flight velocity V of the aircraft, of the angle of incidence a of the aircraft, of the angle $\delta$ S determining the position of the lift-increasing flaps 3, and of the angle $\delta$ F determining the position of the leading edge slats 4 of main wing. A signal representative of the aircraft altitude H may also be sent to the automatic flight control system 16. Of course, all these signals are generated from transducer or sensor means well known in the art and located on or within the aircraft.

The canard airfoil and the possibility of controlling either the total canard surface or the movable trailing edge control surfaces 10 of this canard airfoil allows to fly during all cruise, climb and descent configurations with an optimal incidence angle for all three lifting surfaces and therefore with an optimal angle of attack of the aircraft.

For a stabilized flight condition, which means a set of speed V, altitude H, Mach number and given aircraft mass and aircraft centre of gravity position, there are for the aircraft with canard control surface and controllable horizontal tail surface 5 different combinations of $\delta$ C and $\delta$ H setting possible to keep the aircraft in the stabilized condition.

The control tasks and control laws between forward fuselage mounted canard control device and rear fuselage mounted tail control device should be split in such a manner that the tail control device always tries to stabilize the aircraft and will be deflected in order to guide and control the aircraft along a foreseen flight path, whereas the canard control device will be deflected in such a manner that the overall drag of the aircraft will be kept to a minimum for a given flight condition. As the drag of the aircraft cannot be measured directly, the parameters "fuel flow" and "thrust" have to be used as input signals for the canard control system 17. The canard control surface is deflected in such a manner that "fuel flow" and/or "thrust" will be kept at a minimum value for a given flight condition.

During flight, the control procedure will be as follows:

For a given flight condition and when the lift-increasing flaps and the leading edge slats are at a given position, the flight control system 16 will calculate a "preoptimal" position for the canard control deflection. That is, the flight control system 16 will send a control signal to canard control system 17 which calculates a corresponding signal supplied to canard surface actuator 22. With the canard control deflection fixed in this position, and influencing with its flow field the flow field of the wings 2 and the horizontal tail surface 5, the flight control system 16 will stabilize through the tail plane control channel the aircraft for the given flight conditions (inner loop). By measuring and sampling the interesting economic parameters "fuel flow" and "thrust" the canard control system 17 will then slightly move the position of the canard control surface, wait till the aircraft is stabilized again by deflecting correspondingly the tail control surface through the tail-plane control channel and flight control system 16 receiving the signal representative of angular position δ C of canard control surface, and measure again the economic parameters, and compare whether this canard deflection is better in terms of less fuel flow compared to the previous. This iterative outer "closed loop" control system for the canard control surface allows the aircraft to fly always with an optimal incidence angle for all three lifting surfaces. Of course, sampling, memory and comparing means are incorporated within the canard control system 17 for performing the said steps for allowing the aircraft to fly always with the optimal incidence angle for all three lifting surfaces. These means are not to be described in detail since obvious for a man skilled in the art. It is to be noted that the canard control system will work in very low frequency mode and with small deflections, to avoid big changes in the downwash field and therefore to minimize the impacts on the main wing flow field. As to the tail-plane control system, it will work in the normal frequency mode to stabilize and control the aircraft along the foreseen flight path.

What is claimed is:

1. A fixed-wing large transport aircraft having a fuselage with a nose and a tail spaced therefrom, said fuselage having a center of gravity, said aircraft comprising tandem supporting surfaces including monoplane main wings secured to the fuselage in an intermediate area thereof, each of the main wings having at least one lift-increasing flap and at least one leading edge slat; a horizontal tail surface with at least one stabilizer plane at the tail of said fuselage, said stabilizer plane having a variable angular position which is selectively adjustable through controlled adjustment; a third supporting surface mounted on said fuselage in tandem relation with the other supporting surfaces and including a canard airfoil affixed to said fuselage at the nose thereof in front of the center of gravity thereof, said canard airfoil extending from opposite sides of said fuselage and consisting of a canard plane and a movable trailing edge control surface; means for monitoring the instant position of said stabilizer plane of said horizontal tail surface; a control system for measuring parameters representative of the drag of the aircraft such as the fuel flow and thrust of said aircraft; and wherein the trailing edge control surface of said canard airfoil is controllable in accordance with the position of one of said lift-increasing flap and said leading edge slat thereby producing a positive aerodynamic balance at said horizontal tail surface for the given flight conditions of the aircraft, said control system is adapted to deflect said canard airfoil in accordance with the measured parameters and the horizontal tail surface correspondingly so as to allow the aircraft to fly always with an optimal incidence angle for all three lifting surfaces.

2. A fixed-wing aircraft as claimed in claim 1, wherein said stabilizer plane of said horizontal tail surface has at least one elevator.

3. A fixed-wing aircraft as claimed in claim 1, wherein said control means includes a servosystem having means for monitoring the instant position of said lift-increasing flap, means for monitoring the instant position of said leading edge slat and means for moving said control surfaces of said canard airfoil in follow-up relation to movement of one of said lift-increasing flap and said leading edge slat.

4. A fixed-wing aircraft as claimed in claim 3, wherein the servosystem of said control means includes means for monitoring the angle of incidence of said aircraft, means for monitoring the flight velocity thereof and means for moving said control surfaces of said canard airfoil in accordance with same.

5. A fixed-wing large transport aircraft having a fuselage with a nose and a tail spaced therefrom, said fuselage having a center of gravity, said aircraft comprising tandem supporting surfaces including monoplane main wings secured to the fuselage in an intermediate area thereof, each of the main wings having at least one lift-increasing flap and at least one leading edge slat; a horizontal tail surface with at least one stabilizer plane at the tail of said fuselage, said stabilizer plane having a variable angular position which is selectively adjustable through controlled adjustment; a third supporting surface mounted on said fuselage in tandem relation with the other supporting surfaces and including a canard airfoil affixed to said fuselage at the nose thereof in front of the center of gravity thereof, said canard airfoil extending from opposite sides of said fuselage and consisting of a canard surface; means for monitoring the instant position of said stabilizer plane of said horizontal tail surface; a control system for measuring parameters representative of the drag of the aircraft such as the fuel flow and thrust of said aircraft; and wherein the complete canard surface has a variable angular position which is adjustable through controlled adjustment in accordance with the position of one of said lift-increasing flap and said leading edge slat thereby producing a positive aerodynamic balance at said horizontal tail surface for the given flight conditions of the aircraft, said control system is adapted to deflect said canard airfoil in accordance with the measured parameters and the horizontal tail surface correspondingly so as to allow the aircraft to fly always with an optimal incidence angle for all three lifting surfaces.

6. A fixed-wing large transport aircraft having a fuselage with a nose and a tail spaced therefrom, said fuselage having a center of gravity, said aircraft comprising tandem supporting surfaces including monoplane main wings secured to the fuselage in an intermediate area thereof, each of the main wings having at least one lift-increasing flap and at least one leading edge slat; a horizontal tail surface with at least one stabilizer plane at the tail of said fuselage, said stabilizer plane having a variable angular position which is selectively adjustable through controlled adjustment; a third supporting surface mounted on said fuselage in tandem relation with the other supporting surfaces and including a canard airfoil affixed to said fuselage at the nose thereof in front of the center of gravity thereof, said canard airfoil extending from opposite sides of said fuselage and consisting of a canard plane and a movable trailing edge control surface; means for monitoring the instant position of said stablizer plane of said horizontal tail surface; a control system for measuring parameters representative of the drag of the aircraft such as the fuel flow and thrust of said aircraft; and wherein the trailing edge control surface of said canard airfoil is controllable in accordance with the position of one of said lift-increasing flap and said leading edge slat thereby producing a positive aerodynamic balance at said horizontal tail surface for the given flight conditions of the aircraft, such as the angle of incidence of said aircraft and the flight velocity thereof, said control system is adapted to deflect said canard airfoil in accordance with the measured parameters and the horizontal tail surface correspondingly so as to allow the aircraft to fly always with an optimal incidence angle for all three lifting surfaces.

7. A fixed-wing large transport aircraft having a fuselage with a nose and a tail spaced therefrom, said fuselage having a center of gravity, said aircraft comprising tandem supporting surfaces including monoplane main wings secured to the fuselage in an intermediate area thereof, each of the main wings having at least one lift-increasing flap and at least one leading edge slat; a horizontal tail surface with at least one stabilizer plane at the tail of said fuselage, said stabilizer plane having a variable angular position which is selectively adjustable through controlled adjustment; a third supporting surface mounted on said fuselage in tandem relation with the other supporting surfaces and including a canard airfoil affixed to said fuselage at the nose thereof in front of the center of gravity thereof, said canard airfoil extending from opposite sides of said fuselage and consisting of a canard plane and a movable trailing edge control surface; means for monitoring the instant position of said stabilizer plane for said horizontal tail surface; a control system for measuring parameters representative of the drag of the aircraft such as the fuel flow and thrust of said aircraft; control means including a servosystem having means for monitoring the instant position of said lift-increasing flap, means for monitoring the instant position of said leading edge slat, means for monitoring the angle of incidence of said aircraft, means for monitoring the flight velocity thereof and means for moving said control surfaces of said canard airfoil in follow-up relation to movement of one of said lift-increasing flap and said leading edge slat thereby producing a positive aerodynamic balance at said horizontal tail surface for the given angle of incidence and flight velocity of said aircraft; and wherein said control system is adapted to deflect said canard airfoil in accordance with the measured parameters and the horizontal tail surface correspondingly so as to allow the aircraft to fly always with an optimal incidence angle for all three lifting surfaces.

* * * * *